(12) United States Patent
Johnson et al.

(10) Patent No.: US 8,534,151 B2
(45) Date of Patent: Sep. 17, 2013

(54) GEARBOX OUTPUT SWITCHER

(75) Inventors: David W. Johnson, Tigard, OR (US);
Brent R. Jones, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 1248 days.

(21) Appl. No.: 12/388,158

(22) Filed: Feb. 18, 2009

(65) Prior Publication Data
US 2010/0206686 A1 Aug. 19, 2010

(51) Int. Cl.
*F16H 59/00* (2006.01)
*G03G 15/00* (2006.01)

(52) U.S. Cl.
USPC .......................................... 74/337.5; 399/167

(58) Field of Classification Search
USPC .................. 47/325, 337.5, 340, 422; 347/37, 347/103, 101; 346/134, 138; 400/185, 186, 400/187; 74/325, 337.5, 340, 422
See application file for complete search history.

(56) References Cited

U.S. PATENT DOCUMENTS

| | | | | |
|---|---|---|---|---|
| 3,656,364 A * | 4/1972 | Cable et al. | | 74/422 |
| 3,854,361 A * | 12/1974 | Kercher et al. | | 83/499 |
| 5,265,859 A | 11/1993 | Watson et al. | | |
| 5,563,636 A | 10/1996 | Glassett et al. | | |
| 5,946,859 A * | 9/1999 | Kramer et al. | | 49/362 |
| 6,253,047 B1 | 6/2001 | Hildebrand et al. | | |
| 6,439,081 B1 | 8/2002 | Duff | | |
| 6,457,374 B1 * | 10/2002 | Shen | | 74/335 |
| 6,585,368 B1 * | 7/2003 | Park | | 347/103 |
| 6,771,927 B2 | 8/2004 | Bloemen et al. | | |
| 7,090,215 B2 * | 8/2006 | Mandel et al. | | 271/273 |
| 7,130,562 B2 * | 10/2006 | Foster et al. | | 399/112 |
| 7,617,899 B1 * | 11/2009 | Warner et al. | | 180/190 |
| 8,001,862 B2 * | 8/2011 | Albulushi et al. | | 74/329 |
| 8,090,296 B2 * | 1/2012 | Ito et al. | | 399/167 |
| 2002/0106458 A1 * | 8/2002 | Montano et al. | | 427/410 |
| 2002/0108458 A1 * | 8/2002 | Garcia et al. | | 74/340 |
| 2006/0260902 A1 * | 11/2006 | Marumoto et al. | | 192/89.2 |

FOREIGN PATENT DOCUMENTS

GB 2130682 A * 6/1984

* cited by examiner

*Primary Examiner* — Ha D Ho
*Assistant Examiner* — Jude Agendia
(74) *Attorney, Agent, or Firm* — Maginot, Moore & Beck, LLP

(57) ABSTRACT

A gear switching mechanism for a printing machine comprises at least one pair of input and driven gears, each pair rotationally mounted on a corresponding common axle. The input gear of each pair may be coupled to a common drive, while each driven gear is coupled to a separate output. A rotational gear coupling is mounted to translate along each axle to selectively engage and disengage the corresponding pair of input and driven gears. The rotational gear coupling includes a cam follower that slides along a cam profile of a cam shuttle. The shuttle defines a cam profile that is normal to the common axles. In one embodiment, the cam shuttle translates linearly, while in another embodiment, the shuttle rotates. The cam profile is configured to selectively engage and disengage the rotational couplings of each pair of input and driven gears.

20 Claims, 13 Drawing Sheets

GEARBOX OUTPUT SWITCHER

BACKGROUND

The present disclosure relates to printer devices and more particularly to a gear clutch assembly and method for operating different rollers in the printer device using a single motor.

In many printer devices, an intermediate transfer surface, such as a transfer drum, is used to deliver printer ink from a print head to a print or receiving medium such as paper. More specifically, ink is ejected from jets in the print head onto the transfer drum creating a liquid layer of ink. The receiving medium is then brought into contact with the transfer drum and the ink image is transferred and fused or fixed to the receiving medium.

To assist in the transfer and fixing of the ink image, a transfix roller is often utilized to apply a pressure to the receiving medium thereby pressing the receiving medium against the transfer drum. When or around the time the receiving medium engages the transfer drum for transfixing of the image on the receiving medium, the transfix roller is moved from an unloaded or disengaged position toward a loaded or engaged position. In the loaded position, the receiving medium is sandwiched between the transfer roller and the transfer drum. After the ink image is transfixed on the receiving medium and the receiving medium is ready or about ready to disengage from the transfer drum, the transfix roller is moved from the loaded position toward an unloaded position to permit the receiving medium to exit from the transfix roller and transfer drum. The transfix roller remains in the unloaded position until the next transfix operation occurs.

After the ink is transfixed to the receiving medium from the transfer drum, the transfer drum requires conditioning for a subsequent ink jetting from the print head. Typically, a drum maintenance system is used to condition the transfer drum for receipt of the next ink image. The drum maintenance system, when activated, moves from staged or disengaged position to an operating or engaged position. In the engaged position, a roller included in the drum maintenance system applies oil or other similar functioning substance to the transfer drum. The oil reduces the probability that ink sprayed onto the transfer drum will stick to the transfer drum during the transfix operation. The drum maintenance system also includes an elastomeric or rubber blade that approaches or engages the transfer drum when the drum maintenance system is in the engaged position. The blade meters the oil being applied to the transfer drum. While the drum maintenance system is in the engaged position, the transfix roller remains in its idle unloaded position. Upon completion of the drum maintenance operation, the drum maintenance system is moved to its staged position.

Typically, the transfix roller and the drum maintenance system are cam driven. For instance, each of the transfix roller and the drum maintenance system may be driven by independent cam mechanisms, namely a transfix cam mechanism and a drum maintenance cam mechanism. In one prior art system, two separate motors were used to drive the individual cam mechanisms. The first motor drives the transfix cam mechanism and the second motor drives the drum maintenance cam mechanism, with appropriate switching to activate each motor when needed. A disadvantage of the two motor system is the cost for including two such motors in a print device and the spatial and volumetric constraints within print devices.

In a second prior art system, a single motor is used to drive both the transfix cam mechanism and the drum maintenance cam mechanism. Independent control of the cam mechanisms is achieved through the use of electromagnetic clutches or electromagnetic solenoids. There are several disadvantages in the single motor/electromagnetic clutch or solenoid system. First, electromagnetic clutches and solenoids are unreliable as they tend to fail and render their print devices inoperable. Second, although not always as costly as the two motor system, electromagnetic clutches and solenoids are still costly to include in competitive print devices.

Third, single motor/electromagnetic clutch or solenoid systems do not permit operation of the cam mechanisms simultaneously. Simultaneous or concurrent operation allows the drum maintenance system to be moved toward the engaged position at the same time that the transfix roller is moved from the loaded position to the unloaded position. Such simultaneous operation increases the speed and efficiency of the print device.

One solution to these problems of the prior single motor systems is shown in FIGS. 1-3. FIG. 1 shows a print device 10 having a transfer drum 12 rotatably mounted therein. The print device 10 further includes a print head (not shown) for spraying ink onto the transfer drum 12, a preheater (not shown) for heating a print or receiving medium, such as a sheet of paper, prior to said receiving medium engaging the transfer drum 12, a transfix roller (not shown) for applying pressure to the receiving medium against the transfer drum 12 as the receiving medium passes the transfer drum 12, and a drum maintenance system 16 (FIG. 2). The drum maintenance system 16 includes a roller for applying an oil or like substance to the transfer drum 12 to prevent ink from sticking thereto and a rubber blade for metering the oil applied to the transfer drum 12. A motor driven gear clutch assembly 20 operates or controls the engagement and disengagement of the transfix roller as well as the engagement and disengagement of the drum maintenance system 16.

With reference to FIG. 3, the gear clutch assembly 20 is shown with a first housing piece 22 (FIG. 1) removed to reveal the details of the gear clutch assembly 20. Gears of the gear clutch assembly 20 are in meshing relation with a transfix driving gear 26 and a drum maintenance driving gear 28. The transfix driving gear 26 is a component of a transfix cam shaft assembly 30 which includes a transfix cam shaft 32 and first and second cams 34, 36. Rotation of the transfix driving gear 26 will rotate the cam shaft 32 and the cams 34, 36 mounted thereto. The drum maintenance driving gear 28 is a component of a drum maintenance cam shaft assembly 40 which includes a drum maintenance cam shaft 42 and first and second cams 44, 46 mounted to the cam shaft 42. Rotation of the drum maintenance driving gear 28 will rotate the cam shaft 42 and the cams 44, 46. A motor 48 is separately connected to the gear clutch assembly 20 to drive the gears of the gear clutch assembly 20.

The gear clutch assembly includes a swing arm 50 that selectively engages one or both of the output gear trains 52, 54 to drive the corresponding transfix and drum maintenance driving gears 26, 28. As described in more detail in U.S. Pat. No. 6,585,368, the disclosure of which is incorporated herein by reference, controlled pivoting of the swing arm selectively engages the output gear trains 52, 54 to the drive motor 48. Certain movements of the swing arm 50 allow both forward and reverse rotation of each output gear. Rotation of the swing arm is produced by rotation of a driven gear of the swing arm and controlled by various pins and stops. Independent output gear engagement by the swing arm movement depends in part upon missing teeth in the two output gears.

There remains a need for a gearbox capable of switching between multiple output gears, especially in drive systems for devices like printing devices. The need is particularly acute for providing a low cost, quiet gearbox capable of high torque transmission.

SUMMARY

A gear switching mechanism is provided that may be used in a printing machine, for instance. In certain disclosed embodiments, the gear switching mechanism includes an axle defining a longitudinal axis, a gear supported by the axle for rotation about the longitudinal axis, and a rotational coupling supported by the axle for rotation about the longitudinal axis. The gear and the rotational coupling supported for axial movement relative to each other along the longitudinal axis between a first position in which the rotational coupling is in engagement with the gear to transmit a rotary force thereto and a second position in which the rotational coupling is disengaged from the gear.

In one aspect of the embodiments described herein, the rotational coupling includes a cam follower. In a further aspect of the disclosed embodiments, a shuttle is provided that defines at least one cam surface slidably engaged with the cam follower and configured to move the rotational coupling axially between the first and second positions as the cam surface and the cam follower move relative to each other. A drive mechanism is provided for imparting relative movement between the shuttle and the cam follower in a plane substantially perpendicular to the longitudinal axis.

DESCRIPTION OF THE EMBODIMENTS

Figure 4:
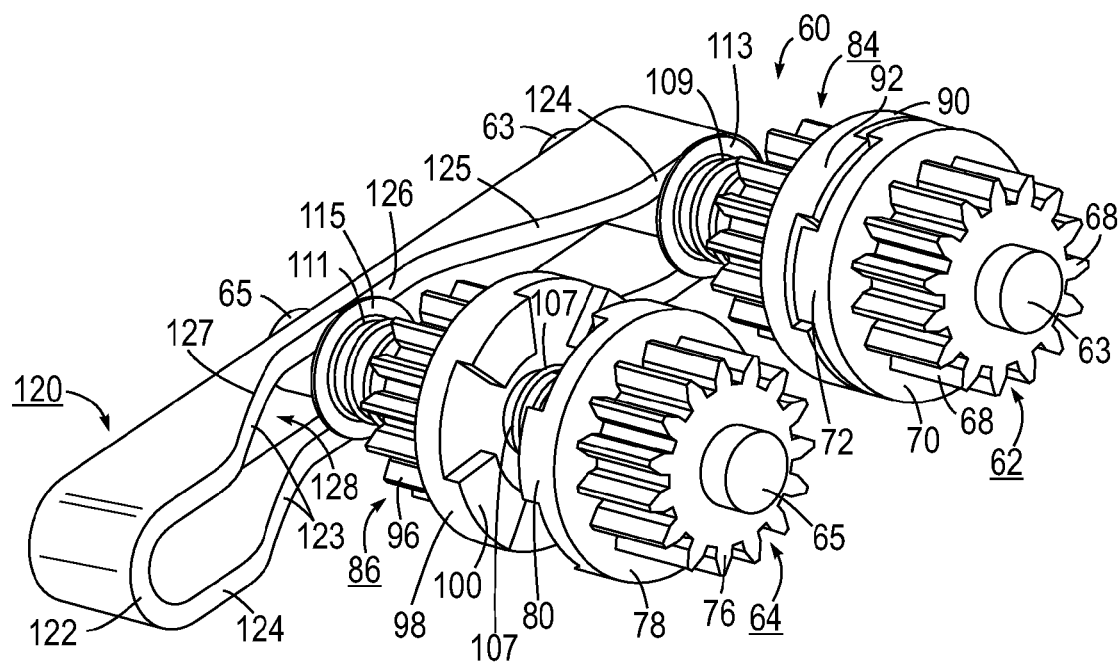
FIG. 4 is a perspective view of a gear switching mechanism according to one embodiment disclosed herein.

According to one disclosed embodiment, a gear switching mechanism 60 is operable to switch between first and second input gear components 62, 64 to selectively engage those components to corresponding first and second driven gear components 84, 86, as illustrated in FIG. 4. The first input and driven gear components 62, 84 are preferably mounted on a common axle 63, while the second gear components are similarly mounted on a common axle 65. The axles 63, 65 may be integrated into one or the other of the input or driven gears, or the axles may be fixed with the gears rotatably mounted on the axles.

The input gear components include corresponding first and second input gears 68, 76 mounted on the corresponding axles 63, 65. An engagement interface or rotational coupling is provided in the form of gear faces 70, 78, each including a series of engagement cogs 72, 80 configured to transmit rotational movement or torque to a mating gear face when engaged or coupled. The gear face engagements may be integral with the corresponding first or second input gear 68, 76 or may be otherwise suitably affixed to the gear face to rotate with the gear. The engagement cogs 72, 80 are uniformly spaced around the circumference of the gear faces 70, 78.

The first and second driven gear components 84, 86 include corresponding driven gears 88, 96 concentrically mounted on the axle 63, 65 common with the first and second input gears 68, 76. Each driven gear also includes a gear face 90, 98 with cogs 92, 100 arranged to engage the cogs 72, 80 in a known manner. The faces of the cogs 72, 80, 92 and 100 may be configured as is known in the art to permit engagement while the input gear is rotating and the driven gear is stationary. For instance, the cogs may include angled faces that provide smooth engagement and disengagement. The gear faces 70, 78 mate with the corresponding gear faces 90, 98 in a known manner—i.e., by relative translation of the two gear faces toward each other. Likewise, the gear face engagements disengage by relative translation away from each other. In the illustrated embodiment, a bias spring 105, 107 is concentrically disposed on each axle 63, 65 between the opposing input and driven gear engagement pairs of gear faces 70, 90 and 78, 98. The bias springs thus bias the two gear faces apart so that no rotational movement or torque is transmitted from input gear to driven gear, unless they are otherwise forced into engagement.

The gear switching mechanism 60 incorporates a translating shuttle cam 120 that is operable to selectively bring the gear face pairs into engagement. The shuttle cam 120 is formed by a perimeter wall 122 that defines a slot 128. The axles 63, 65 extend through the slot, as shown in FIG. 4. The perimeter wall defines cam edges 123 on opposite sides of the shuttle cam and opposite end wall edges 124. The cam edges 123 incorporate a number of profile segments 125, 126, 127. Each driven gear component 84, 86 includes a cam follower 113, 115 that is configured to ride along the opposing cam edges 123 along the profile segments 125-127. The profile segments are thus configured to raise or lower the cam followers as the shuttle cam 120 translates relative to the axles 63, 65.

In one embodiment, the cam followers 113, 115 may be integral with a corresponding driven gear 88, 96. However, in the embodiment illustrated in FIG. 4, engagement springs 109, 111 are interposed between the cam followers 113, 115 and the driven gears 88, 96. The engagement springs 109, 111 facilitate the engagement of the cogs of the mating gear faces. For example, when the cam follower 115 of the second gear component 86 moves from the lower profile segment 126, along the intermediate segment 127 to the higher end wall edge 124, the cam follower is moved in an axial fashion to push the driven gear component 86 upward toward the rotating input gear face 78. Since the input gear face is rotating, the cogs 80, 100 may not immediately engage. The engagement spring 111 compresses to create the force needed to cause the cogs to engage but in effect, "absorbs" the upward movement of the driven gear face until the cogs are aligned and engaged. It should be understood that the spring force of the engagement springs in their fully extended state is less than the spring force of the bias springs, otherwise the engagement springs would overpower the bias springs and draw the mating gear faces together. However, the spring force of the engagement springs when compressed, such as when the cam follower 113 is at the end edge 124, is sufficient to compress the bias spring to push the mating gear faces together.

Figure 5:
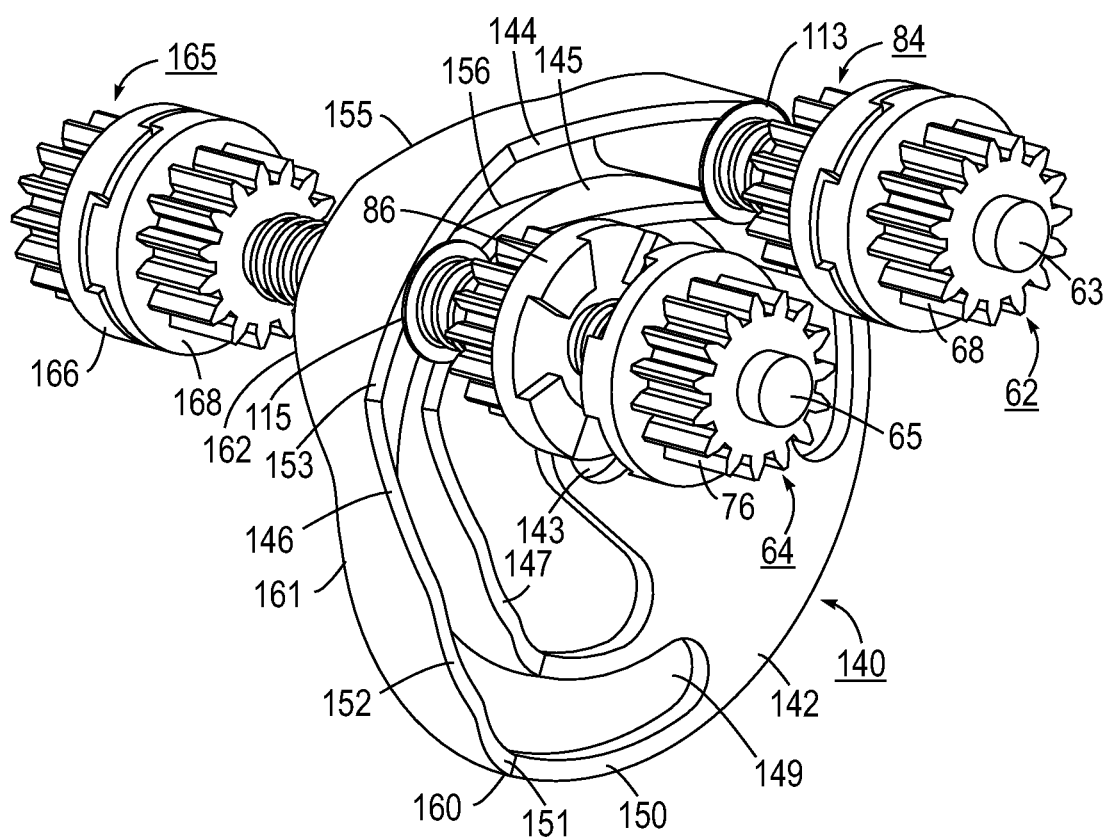
FIG. 5 is a perspective view of a gear switching mechanism according to another embodiment disclosed herein.

In another embodiment illustrated in FIG. 5, the shuttle cam 140 rotates, rather than translates as in the embodiment of FIG. 4. (It is noted that while the term shuttle most generally refers to linear or back and forth motion, for the present disclosure the term applies to any motion, including rotational and serpentine.) In this embodiment, the shuttle cam 140 includes a shuttle disc 142 that is mounted for rotation at its center 141. The disc may define an opening at the center 143 for mounting on a pivot bolt or the like. The shuttle cam 140 defines an outer wall 144 and an opposite inner wall 145, together which forms a slot 149 within which the axles 63, 65 reside in the manner describe above with respect to the shuttle cam 120. The outer wall 144 defines a cam outer edge 146, while the inner wall defines a corresponding cam inner edge 147. As in the previous embodiment, the outer and inner edges 146, 147 define a profile that is essentially parallel to cam motion. In the embodiment illustrated in FIG. 5, this profile includes profile segments 150, 151, 152 and 153 that are, in the illustrated embodiment, mirrored at each half of the cam profile. The profile segments 151 gradually transition to the profile segment 150 that may preferably be flush with the plane of the shuttle disc 142.

As with the shuttle cam 120, movement of the shuttle cam 140 causes the engaging gear faces of the two gear components 62, 64 (FIG. 4) to engage and disengage as the respective cam followers 113, 115 follow the profile segments 150-153. In other words, as the shuttle cam 140 rotates, the profile segments sequentially move beneath the two cam followers 113, 115. The cam followers move up and down with the profile segments, with upward movement causing the cogs of the corresponding gear faces to engage and transmit rotation/torque from the input gear 68, 76 to the driven gear component 84, 86.

Another feature of the illustrated embodiments is shown in FIG. 5, namely the rear gear component 165 that is disposed on the rear face of the shuttle cam 140 relative to the other gear components 62, 64. As shown in FIG. 5, this rear gear component 165 may reside on a common axle with one of the other gear components, such as on the axle 65. The rear gear component 165 is configured like the other gear components with a cam follower (not shown) that translates the driven gear 168 into engagement with the input gear 166. The cam follower for the rear gear component follows a cam profile defined at the rear cam outer and inner edges 155, 156. Thus, the engagement/disengagement of the rear gear component may be governed by profile segments 160, 161, 162, as shown in FIG. 5. It can be appreciated that the profile segments 160-162 need not parallel the profile segments 150-153, so that the engagement/disengagement of the rear gear component need not coincide with the engagement/disengagement of gear component 64 that shares the common axle 65. It can also be contemplated that the axle 63 of the other gear component 62 may include a similar rear gear component mounted thereon. Furthermore, a distinct rear gear component with its own axle may also be provided that is independent of the two gear components 62, 64.

It should be understood that the arrangement of the gear components, whether on the front or rear of either shuttle cam 120, 140, is dictated by the necessary profile segments, and the range of travel of the shuttle cam. In both shuttle cams, the slot 128, 149 through which the axles 63, 65 extend is closed at the opposite ends so that the relative travel of the axles within the slots is limited.

In accordance with the illustrated embodiments of FIGS. 4-5, the shuttle cams 120, 140 are driven so that the corresponding cam profile segments pass by each cam follower. Optimally, but not necessarily, the shuttle cam will be driven by a motor common to various gear components. The shuttle cam 120 is linearly translated along the axis of the slot 128. As indicated above, the shuttle cam 120 must be driven forward and backward as one cam follower or the other reaches the end walls 124 of the shuttle cam. The shuttle cam 120 may thus be driven by a mechanism capable of producing linear movement, such as a rack and pinion gear arrangement or an eccentric arm on a rotating shaft. The shuttle cam 140 is rotated clockwise and counter-clockwise by an appropriate motor and/or transmission. The shuttle cam 140 may be rotated by a shaft affixed to at the center 143 of the shuttle disc 142. Alternatively, the outer edge of the disc apart from the cam walls 144, 145 may define gear teeth for meshed engagement with a drive gear.

Figure 2:
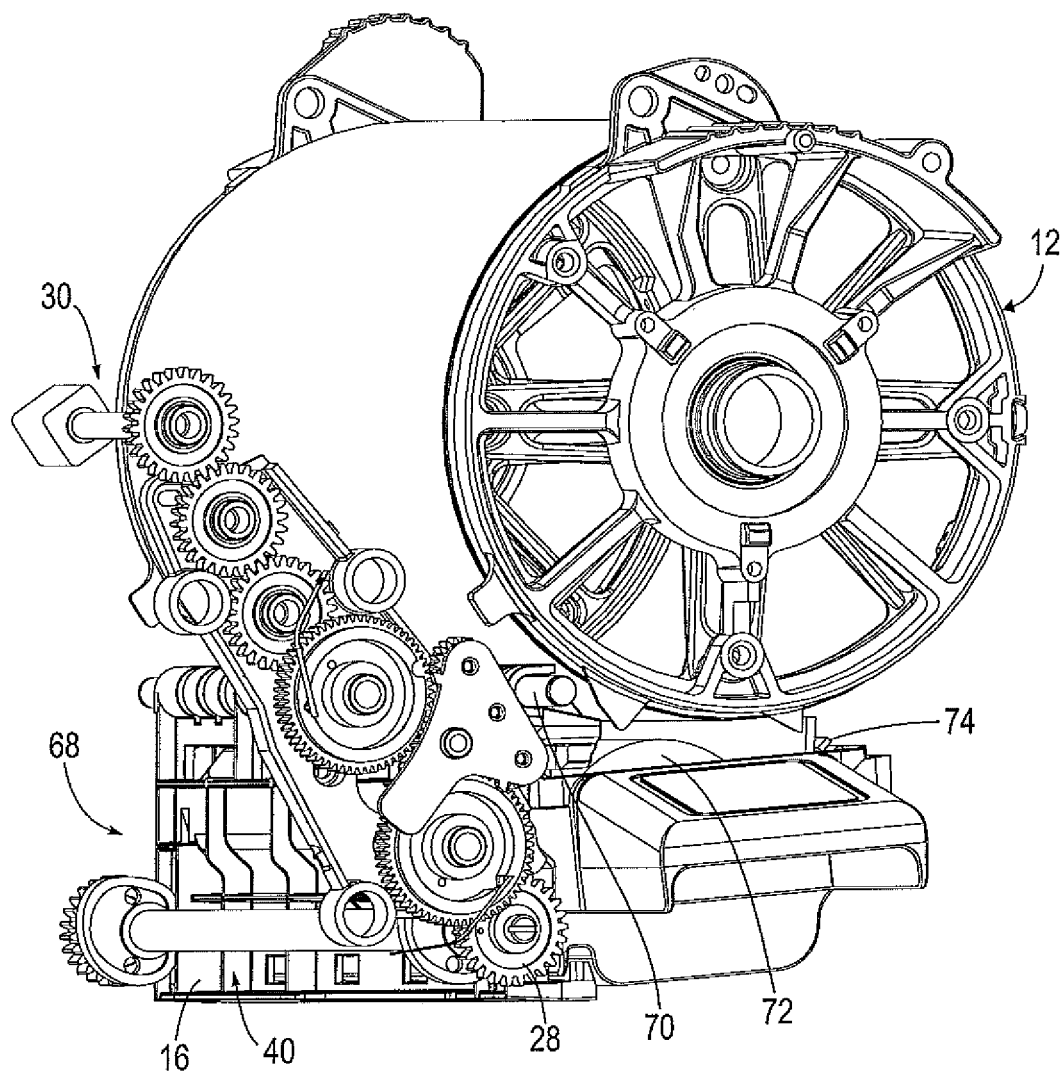
FIG. 2 is a perspective view of select components of the print device of FIG. 1 including the transfer drum, the gear clutch assembly and a drum maintenance system assembly.
Figure 3:
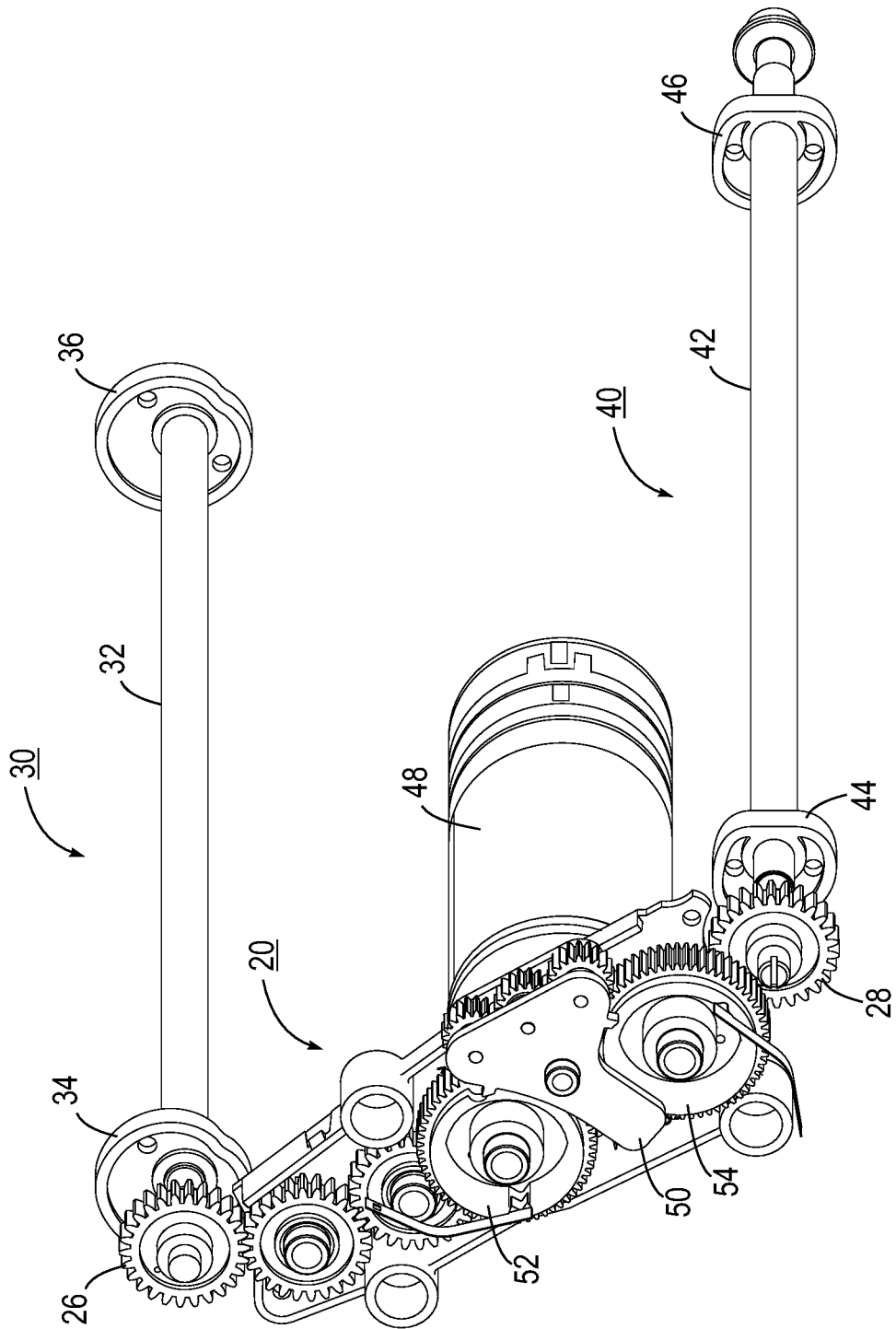
FIG. 3 is perspective view of select components of the print device of FIG. 1 including the gear clutch assembly, a motor, and first and second cam shaft assemblies operatively engaged with the gear clutch assembly.

The gear switching mechanism of the disclosed embodiments may be used in a variety of applications that require switching or selecting among output gear trains. One particular application is in the printing machine 10 described above. The gear switching mechanisms disclosed herein may replace the gear clutch assembly 20 of the prior printing machine shown in FIGS. 1-3. More specifically, the shuttle cam 120, 140 can replace the swing arm 50 (FIG. 3) as the mechanism for transferring rotation/torque from the motor 48 to one of the output gear trains 52, 54.

Figure 1:
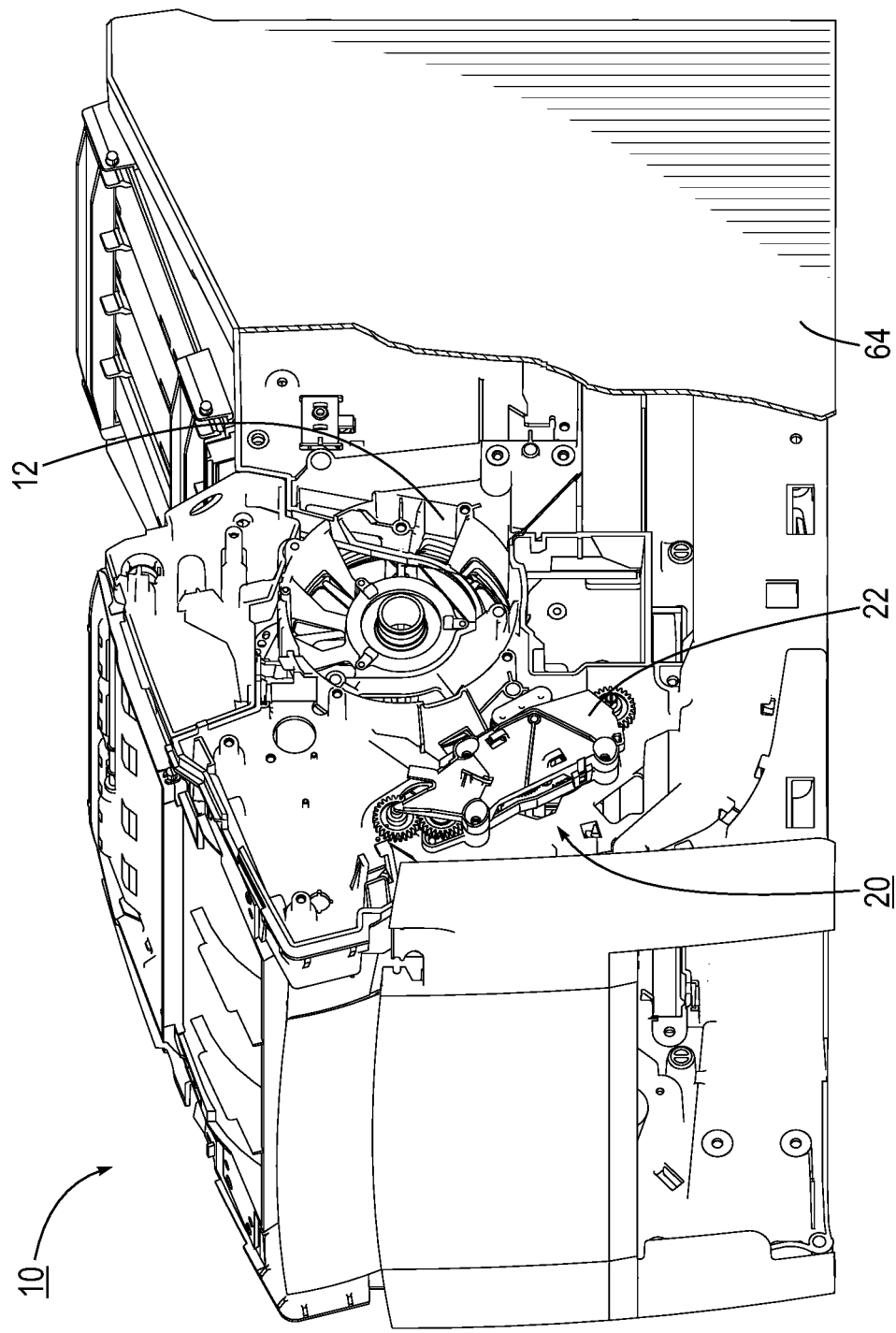
FIG. 1 is a perspective view of a print device shown with a side cover of the print device removed to reveal a transfer drum and a gear clutch assembly operatively received within the print device.
Figure 6:
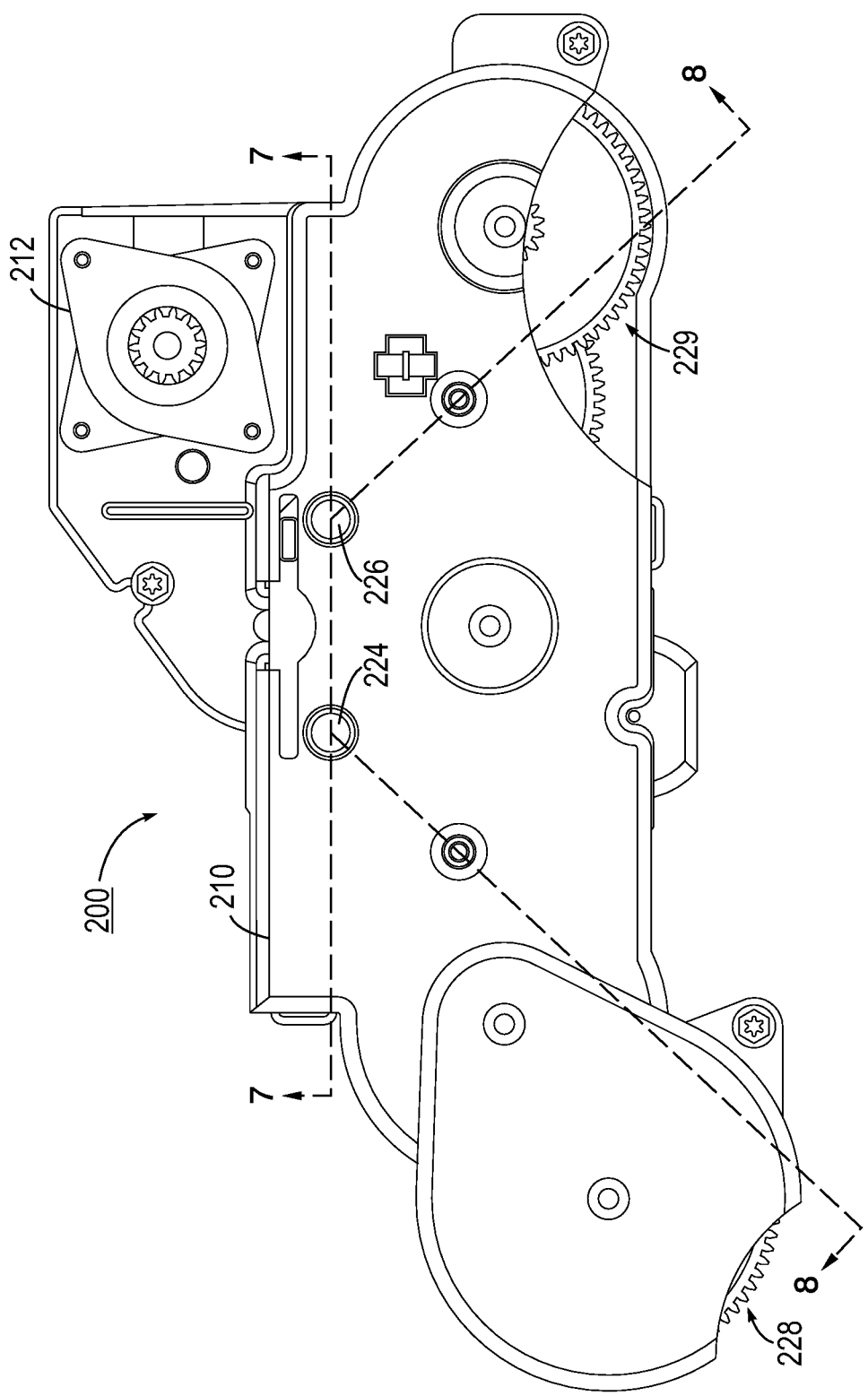
FIG. 6 is a top view of a gear switching mechanism for use in a printing machine, such as the machine shown in FIG. 1.
Figure 7:
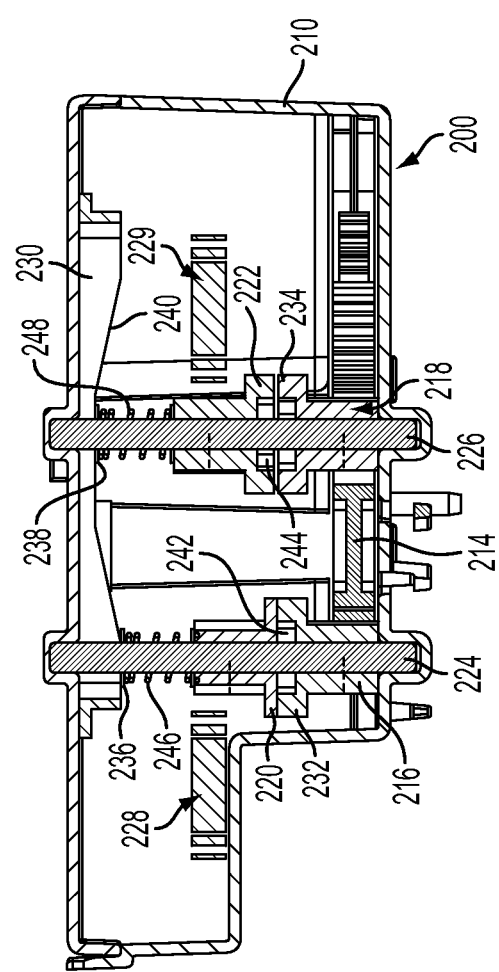
FIG. 7 is a section view of the mechanism shown in FIG. 6, taken along line 7-7 as viewed in the direction of the arrows.
Figure 8:
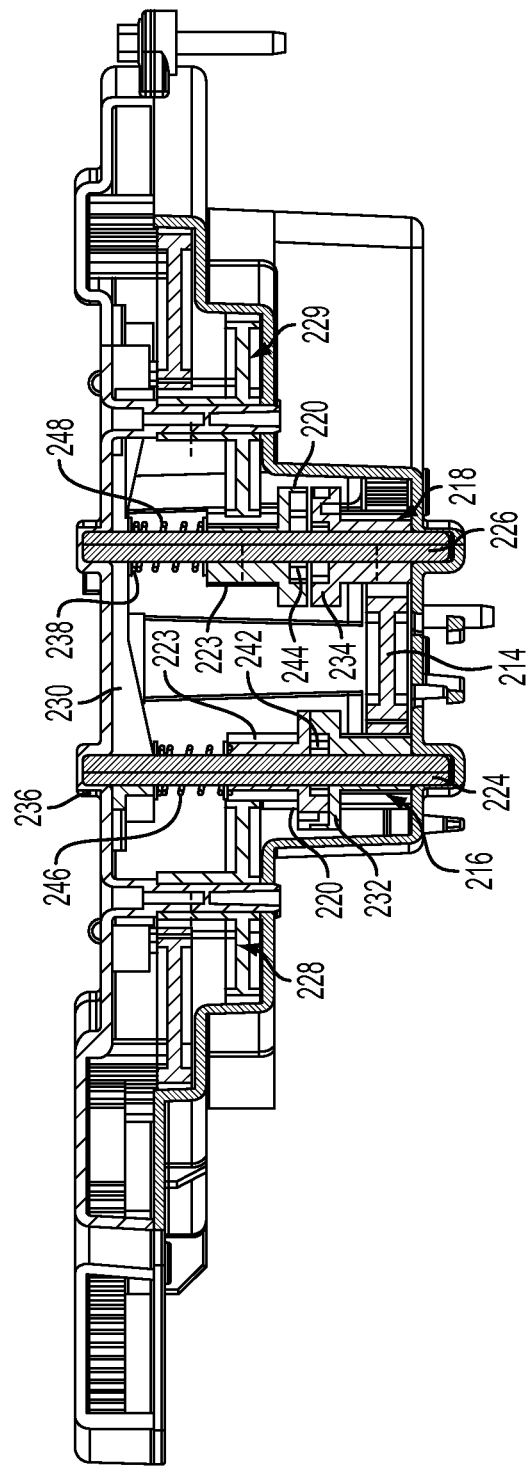
FIG. 8 is a section view of the mechanism shown in FIG. 6, taken along line 8-8 as viewed in the direction of the arrows.

Thus, as shown in FIGS. 6-8, a gear switching mechanism 200 may be provided within a housing 210 that is adapted to be mounted within any mechanical device, for example a printing machine such as the machine 10 shown in FIG. 1. A drive motor 212 rotates a drive gear 214 that is in constant engagement with two input gear components 216, 218. Each input gear component is mounted on a corresponding common axle 224, 226 with a corresponding driven gear component 220, 222, all as described above. Each driven gear component is in constant engagement with a corresponding output gear train 228, 229, which in one example may drive a one of the transfix cam shaft assembly 30 (FIG. 3) or the drum maintenance cam shaft assembly 40 (FIG. 3) of the printing machine 10.

Each input and driven gear pair includes an engagement interface 232, 234 that permits selective engagement of the driven gear to the input gear for the transmission of rotation and torque therebetween. This engagement interface 232, 234 may incorporate the engagement cog configuration described above. Alternatively, the engagement interface may incorporate some other suitable interface that is linearly actuated to transmit rotation between the gear components, such as opposing clutch surfaces. The nature of the interface is determined by the force required to maintain the engagement, the torque to be transmitted, cost of components and other factors. For the disclosed printing machine, an engagement cog arrangement is preferable because it requires minimal force to initiate and maintain and because it has high torque transmission capabilities.

Each driven gear component includes a cam follower 236, 238 that follows the cam profile 240 of a shuttle cam 230. In the embodiment illustrated in FIGS. 6-8, the shuttle cam is a linear shuttle cam, such as the shuttle cam 120 shown in FIG. 4. Bias springs 242, 244 are positioned between the input and driven gears to bias the gear components in the non-engaged position, such as the input gear component 216 and drive gear component 220. Engagement springs 242, 244 are disposed between the cam followers and the driven gear components and are operable to linearly translate the corresponding driven gear when the corresponding cam follower is elevated by the shuttle cam, such as the follower 238, spring 248 and driven gear component 222 shown in FIGS. 7-8.

With particular reference to FIGS. 7-8, it can be seen that the driven gear components 220, 222 include driven gears 223 that have elongated splines. In particular, the splines are long enough so that the driven gears 223 remain in meshed engagement with the associated output gear train 228, 229 when the driven gear component is disengaged, such as the driven gear component 220, or engaged, such as the driven gear component 222. The length of the splines is dictated by the amount of axial travel of the driven gear component, which in turn is controlled in part by the height of the engagement cogs (such as cogs 72, 80, 92, 100 in FIG. 4). In can be appreciated that in the disengaged position the opposing engagement cogs, such as cogs 72 and 92 in FIG. 4, the cogs cannot contact, and that when fully engaged the driven gear component must move upward by the height of the cogs. Thus, the length of the splines on the driven gears 223 must be at least equal to the height of the cogs.

The gear switching mechanism provides robust performance, particularly in high torque applications. The mechanism further permits the use of materials that provide low manufacturing costs. For instance, the sliding components, such as the engagement cogs, shuttle cam and cam followers can be formed of a lower modulus lubricious plastic, such as acetyl, nylon, polyethylene and polypropylene. Other less lubricious materials may be suitable depending upon load, duty cycle, switching speed and permissible noise level. Such other materials may include polyphenylene sulfide, polyurethane, aluminum and brass. The components are preferably molded, rather than machined.

The engagement cogs 72, 80, 92, 100 may be configured for shallow, rapid engagement with short travel required for engagement. On the other hand, increased engagement area necessary for higher torque applications can utilize a longer travel, and therefore cogs having greater height. The cogs themselves may have square engagement faces for maximum drive force with very little rotational friction or axial cam-out tendency. Alternatively, the drive faces of the cogs may be slightly angled for greater smoothness during engagement and quieter operation. The angled faces make cam-out more likely at higher loads, so the use of angled cog drive faces inherently limits the torque transmission capabilities of the engagement interface. Portions of the cogs may be angled for clearance to enable or enhance engagement and other portions may be straight or nearly so with minimal clearance for improved force transmission and/or slack or hysteresis control.

In accordance with certain embodiments, the cog engagement is facilitated by maintaining the rotation of the input gears while the shuttle cam is moving. In some applications, particularly where multiple engagements or disengagements are occurring, the rotational speeds may be reduced momentarily to facilitate complete engagement. In an alternative embodiment, gear positional and/or rotation angle detectors or sensors may be employed so that engagement may be accomplished without rotating one or the other of the gears.

In the illustrated embodiments, the input gear components 62, 64 do not translate along the axles 63, 65, but simply rotate as the driven gears for the switching mechanism. However, the translated gear components may become the driven gears with rotational movement and torque being transmitted from the translated gear components, such as gear components 84, 86 in FIG. 4, to the axially stationary gear components, such as components 62, 64. Elongated splines on the gears 88, 96 allow the translated gear components to continuously rotate even as the gears are elevated as the shuttle cams 120, 140 drive the cam followers 113, 115. The drive can be configured so that either of the gears in a set can be an input with the other being the output.

One feature of the described embodiments is that the shuttle cams may be configured differently for different devices and applications. For example, as shown in FIG. 4, the shuttle cam 120 is configured so that one gear set is engaged while the other is disengaged—i.e., only one output is driven at a time. On the other hand, the cam profile for the shuttle cam 140 shown in FIG. 5 is configured so that both gear sets are driven at one time, such as when the shuttle cam 140 is positioned with the profile segment 153 contacting both cam followers 113, 115 at the same time. In the embodiment of FIG. 5, it can be appreciated that the cam follower 115 will remain on the profile segment 153 even after slight counterclockwise rotation, while the other cam follower 113 will drop to the profile segment 150 to disengage the corresponding gear set 62 while the other gear set 64 remains engaged. Full clockwise rotation will similarly disengage the gear set 64 while the gear set 62 remains engaged; however, as the shuttle cam disc 142 rotates from the full counter-clockwise to the full clockwise position the two gear sets will be simultaneously engaged over at least the profile segments 152 and 153.

The cam profiles may also be modified to control the torque transmission capability of a particular gear set. For instance, the engagement interface may constitute a clutch interface, rather than the cog arrangement shown in FIGS. 4-5. With a clutch interface the amount of torque transmission depends upon the axial force applied to press the clutch surfaces together. Limited slip may be permitted at certain axial loads. The cam profile may be calibrated to slightly reduce the axial force applied through the engagement spring to the driven gear, for instance, to continuously or selectively permit a limited slip condition, versus the no slip condition when the clutch is completely engaged.

The cam shuttles of the various embodiments disclosed herein may be driven by various devices. The drive device may be separate from the drive mechanism for the input gear components, such as a separate solenoid, pneumatic/hydraulic cylinder or motor. The drive device may be coupled to the shuttle in a number of ways suitable to impart the necessary translational or rotational motion to the shuttle. For instance, the drive coupling may be by a direct mechanical linkage, through a gear train or transmission, or by way of a driven lead screw, belt or chain.

Figure 9:
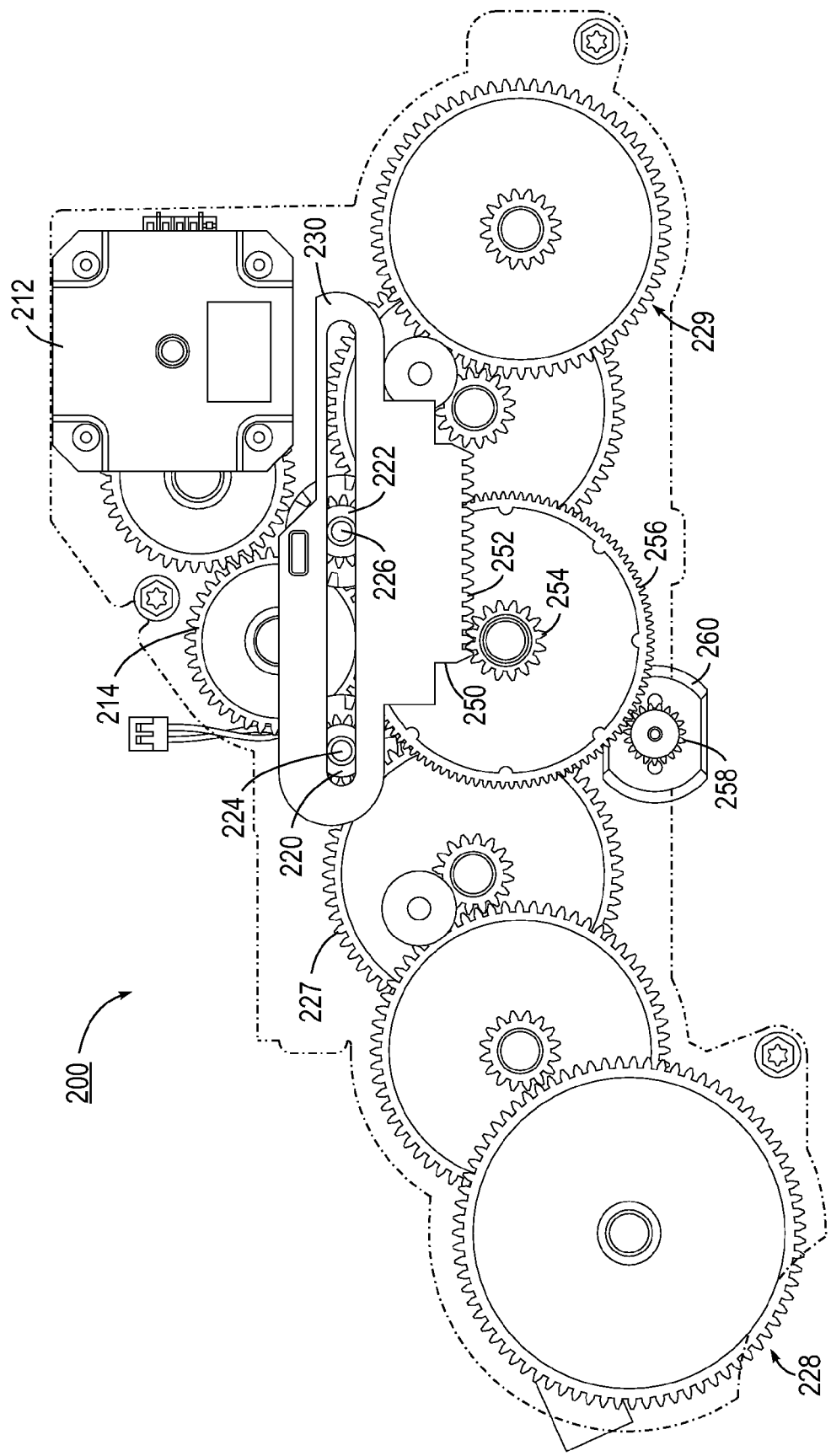
FIG. 9 is a bottom view of the mechanism shown in FIG. 6, with the housing removed to reveal the gear trains within.

In the illustrated embodiment shown in FIGS. 6-8, the translating shuttle cam 230 is driven by a rack and pinion arrangement. Thus, as illustrated in FIG. 9, the shuttle cam 230 is provided with a lateral extension 250 that defines a gear rack 252. It can be appreciated that this lateral extension 250 runs essentially parallel to the base of the housing 210 and may be configured for low-friction sliding contact with the housing. The gear rack 252 meshes with a pinion gear 254 that may be integral with or affixed to a drive gear 256. The drive gear 256 is driven by an output gear 258 of a motor 260. The motor 260 is independent of the motor 212 used to drive the output gear trains 228, 229, but is preferably commonly controlled. Dampers or bumpers may be provided at the ends of travel for the shuttle cam and/or rack component to minimize operational noise. Sensors may also be provided at the ends of travel to reverse the direction of operation of the drive device.

Figure 10:
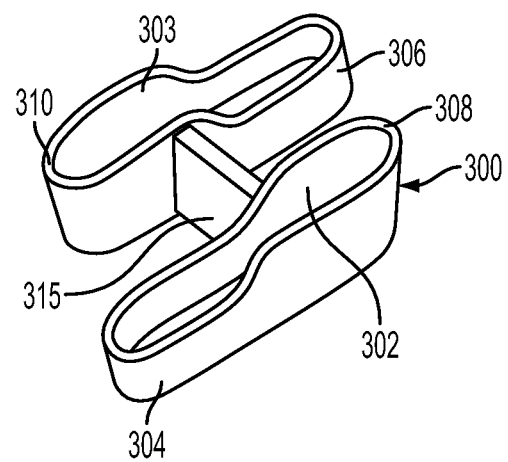
FIG. 10 is a perspective view of a shuttle cam according to a further disclosed embodiment.

In the two previous embodiments, the slots 128, 149 are configured to simultaneously contain all the axles 62, 64 associated with the gear sets of the mechanism. This arrangement thus provides a self-guiding feature for the shuttle cams provided that the axles 63, 65 are held stationary. Alternatively the shuttle cam may be configured with separate slots or tracks for each axle. Thus, a shuttle cam 300 may be provided as shown in FIG. 10 having two slots 302, 303 for receiving one each of the axles 63, 65. The shuttle cam thus includes two perimeter walls 304, 306 that define cam profile edges 308, 310 that may be identical or different as depicted in FIG. 9. The two perimeter walls may be attached by a bridge piece 315 or may be flush with each other, depending upon the size and orientation of the gear components mounted within each slot. With this shuttle cam, the cam 150 is translated along an axis perpendicular to the common line between the axles 63, 65, rather than collinear with that line as with the shuttle cam 120 shown in FIG. 4. The desirability of using one or the other of the linear shuttle cams 120 or 150 depend upon space requirements for the particular application.

In the illustrated embodiments, bias springs 105, 107 are situated between the gear face engagement pairs 70, 90 and 78, 98 that oppose the movements induced by the shuttle cams and that bias the engagement interfaces to the disengaged position. The bias springs may be replaced with other components capable of biasing to the disengaged position but also capable of being overcome by movement of the cam followers. Thus, alternative embodiments may utilize closed pneumatic/hydraulic cylinders, compression springs, extension springs, leaf springs, or torsion springs. Similarly, the engagement springs 109, 111 disposed between the cam followers 113, 115 and gear faces 90, 98 may be replaced by levers, screws or combinations of springs and similar devices. Gear faces illustrated are suggestive of a face engagement plate or an integrated flange with engagement cogs. Smaller gears may be configured in this fashion, however, it possible, even likely with larger gears, to incorporate face engagement features over an area smaller in diameter than the gear.

A multiplicity of cams and gears may be configured for applications that benefit from spatial separation of gear sets or multiple gear engagements. In such an applications, multiple cams may be used, coupled with integral or affixed links or external phasing means, such as gears. For simplicity, the surface of a profile defining a cam that interfaces with a cam follower can be termed a rib or cam rib. In another embodiment, one or more cam slots may be open at one end such that the cam ribs may appear fork like. Other cam configurations may be employed, such as, for example, a single rib running through a slot in a stationary shaft or a rotational cam with independent inner and outer cam ribs acting in unison on a cam follower, moved and phased by an external gear, chain or belt. The latter example would allow a unidirectional motion or any cam rotation angle, including greater than 360 degree rotations, with or without reversal. Cam profiles may be made up of one, two (such as the slotted example) or greater number of ribs. If the cam is formed from a molded component, the rib configuration may be controlled, in part, by features of the molding process to maintain optimum flow or minimize sink or other deformations while at the same time providing increased surface area for reducing force, pressure and/or wear.

Figure 11:
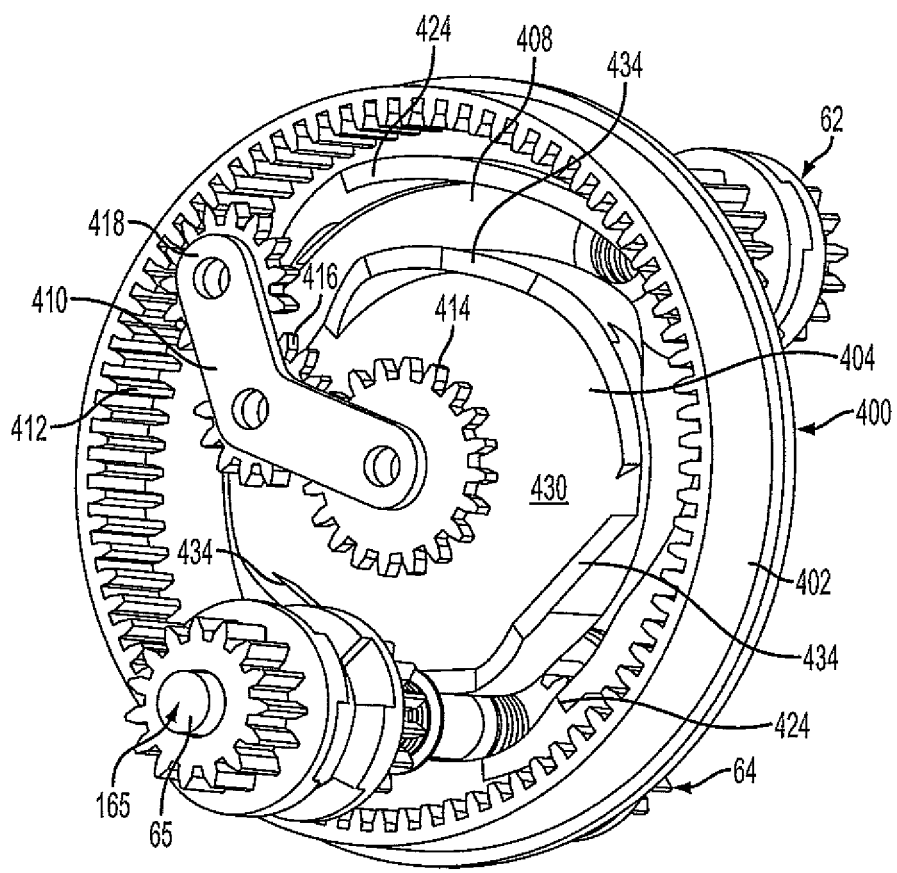
FIG. 11 is a bottom perspective view of a gear switching mechanism according to another embodiment.
Figure 12:
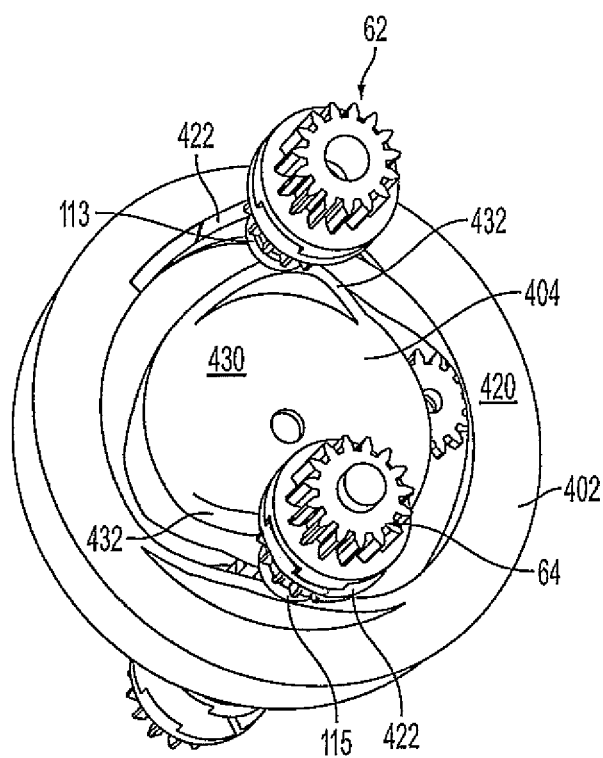
FIG. 12 is a top perspective view of the gear switching mechanism shown in FIG. 11.
Figure 13:
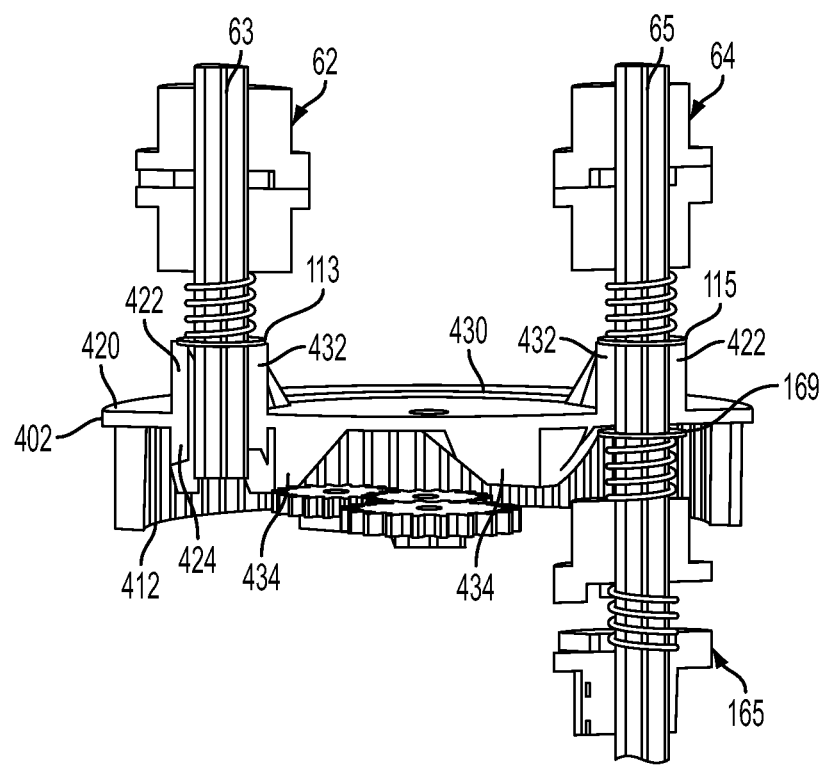
FIG. 13 is a side cross-sectional view of the gear switching mechanism shown in FIGS. 11-12.

An example of such a rotational cam with independent inner and outer cam ribs is shown in FIGS. 11-13. The gear switching mechanism 400 includes an outer ring shuttle 402 and an inner shuttle disc 404 that are concentrically mounted for rotation within a particular machine. The two shuttles 402, 404 define a continuous slot 408 between the two components through which the axles 63, 65 (FIG. 13) extend in the manner described above. As shown in the figures, the gear switching mechanism 400 can be implemented with the gear components 62, 64 and 165 described above. Each gear component includes a corresponding cam follower 113, 115 and 169 that is configured to engage a cam surface as described herein.

The two shuttles 402, 404 may be synchronized in rotation by a phasing mechanism 410 that is operable to ensure a fixed rotational relationship between the cam surfaces on each of the two shuttles. Thus, in one embodiment, the phasing mechanism 410 may include an ring gear 412 defined on an interior surface of the outer ring shuttle 402, a inner gear 414 mounted to the inner shuttle disc 404, and a phasing gear 416 therebetween. A support bracket 418 is provided to rotationally support the gears of the phasing mechanism. It is contemplated that any one of the components may be rotationally driven to impart phased rotation to the remaining components. For instance, the phasing gear 416 may connected to a separate drive mechanism for controlled rotation of the two shuttle components.

The outer ring shuttle 402 includes a circumferential rim 420 that supports the cam surfaces or cam ribs. Thus, in one embodiment, a pair of upper cam ribs 422 project from one surface of the rim 420, while lower cam ribs 424 project from an opposite face of the rim. Similarly, the inner shuttle disc 404 includes upper cam ribs 432 projecting from one surface of the disc, and lower cam ribs 434 projecting from the opposite surface. In one embodiment, a like number of upper cam ribs 422 and 432 is provided on the two shuttle components, with corresponding pairs of ribs facing each other across the continuous slot 408. The facing pairs of cam ribs 422, 432, support the cam followers 113, 115 of two gear components 62, 64, as shown best in FIG. 12.

As seen in FIGS. 11 and 13, a similar correspondence may be implemented for the lower cam ribs 424, 434. It can be appreciated that the upper and lower cam ribs can be variously positioned around the circumference of the concentrically rotated shuttles 402, 404. In other words, the upper cam ribs 422, 432 may be aligned at 0° and 180° degree positions while the lower cam ribs 424, 434 may be arranged at 90° and 270° positions, for example. Of course, other angular arrangements are possible depending upon the needs of the particular application. Moreover, the shuttles may be provided with different numbers of cam rib pairs on the upper and lower surfaces. It can be appreciated that rotation of the outer ring shuttle 402 and inner shuttle disc 404 is operable to engage and disengage the gear components in the manner described above. It should be further understood that the concentric shuttles may be continuously rotated in a single direction or capable of reversing rotation, depending upon the particular application.

The gear switching mechanisms disclosed herein operate to select among multiple outputs from a common input. Alternatively, the mechanisms may be used to select among multiple inputs for a common output. Multiple inputs and/or outputs may also be accommodated with the cam shuttle concept. Similarly, engagement cogs may take various shapes other than circular segments, such as for example, triangular, square or round (pins or pin shape). Drive and driven gears may employ any combination of engaging cog configurations including protrusions and insets.

What is claimed is:

1. A gear switching mechanism comprising:
an axle defining a longitudinal axis;
a gear supported by said axle for rotation about said longitudinal axis;
a rotational coupling supported by said axle for rotation about said longitudinal axis;
said gear and said rotational coupling supported for axial movement relative to each other along said longitudinal axis between a first position in which said rotational coupling is in engagement with said gear to transmit a rotary force thereto and a second position in which said rotational coupling is disengaged from said gear, said rotational coupling having a cam follower;
a shuttle defining at least one cam surface slidably engaged with said cam follower and configured to move said rotational coupling axially between said first and second positions as said cam surface and said cam follower move relative to each other; and
a drive mechanism for imparting relative movement between said shuttle and said cam follower in a plane substantially perpendicular to said axis,
wherein said rotational coupling includes;
a driven gear separate from said gear for transmitting rotation outside said switching mechanism
a bias spring between said gear and said driven gear; and
an engagement spring disposed between said cam follower and said driven gear,
wherein said bias spring is configured to bias said rotational coupling to said second position, and said engagement spring is configured to overcome said bias spring when said cam follower moves relative to said cam surface.

2. The switching mechanism according to claim 1, wherein said shuttle includes opposing walls spaced apart to define a slot therebetween through which said axle extends, each of said opposing walls defining at least one of said at least one cam surface.

3. The switching mechanism according to claim 2, further comprising:
a second axle defining a second longitudinal axis and extending through said slot in said shuttle;
a second gear supported by said second axle for rotation about said second longitudinal axis;
a second rotational coupling supported by said second axle for rotation about said second longitudinal axis and having a second cam follower slidably engaged with said at least one cam surface of said shuttle; and
wherein said cam surface is configured to move said second rotational coupling axially as said at least one cam surface and said second cam follower move relative to each other.

4. The switching mechanism according to claim 1, wherein said drive mechanism is coupled to said shuttle to move said shuttle relative to said cam follower.

5. The gear switching mechanism according to claim 4, wherein said drive mechanism includes a rack and pinion arrangement.

6. The switching mechanism according to claim 5, wherein:
said gear is rotationally driven by an input motor; and
said drive mechanism includes a drive motor separate from said input motor.

7. The switching mechanism according to claim 4, wherein said at least one cam surface follows a substantially linear path and said drive mechanism is configured to linearly translate said shuttle.

8. The gear switching mechanism according to claim 1, wherein said at least one cam surface follows a substantially arcuate path perpendicular to said longitudinal axis and said drive mechanism is configured to rotate said shuttle.

9. The switching mechanism according to claim 1, wherein said rotational coupling includes opposing rotating surfaces defining a number of mating cogs configured to transmit torque therebetween.

10. The switching mechanism according to claim 1, further comprising:
a second axle defining a second longitudinal axis;
a second gear supported by said second axle for rotation about said second longitudinal axis, said second gear disposed on an opposite side of said shuttle;
a second rotational coupling supported by said second axle for rotation about said second longitudinal axis and having a second cam follower; and
wherein said cam follower is slidably engaged to a first one of said at least one cam surface and said second cam follower slidably engages a different second one of said at least one cam surface configured to move said second rotational coupling axially as said second one of said at least one cam surface and said second cam follower move relative to each other.

11. The switching mechanism according to claim 1, further comprising:
a second gear supported by said axle for rotation about said longitudinal axis and disposed on an opposite side of said shuttle;
a second rotational coupling supported by said axle for rotation about said longitudinal axis and having a second cam follower; and
a second one of said at least one cam surface slidably engages said second cam follower and is configured to move said second rotational coupling axially as said second one of said at least one cam surface and said second cam follower move relative to each other.

12. The switching mechanism according to claim 1, wherein:
said shuttle includes a disc;
a number of said at least one cam surface is defined by a rib projecting from said disc substantially parallel to said longitudinal axis; and
said longitudinal axis of said axle extends outside said disc.

13. The switching mechanism according to claim 12, wherein said disc includes at least one rib projecting from one face of said disc and at least one rib projecting from an opposite face of said disc.

14. The switching mechanism according to claim 1, wherein:
said shuttle includes a ring;
a number of said at least one cam surface is defined by a rib projecting from said ring substantially parallel to said longitudinal axis; and
said longitudinal axis of said axle extends inside said ring.

15. The switching mechanism according to claim 14, wherein said ring includes at least one rib projecting from one face of said ring and at least one rib projecting from an opposite face of said ring.

16. The switching mechanism according to claim 14, wherein:

said shuttle further includes a disc concentrically disposed inside said ring;

a number of said at least one cam surface is defined by a rib projecting from said disc substantially parallel to said longitudinal axis; and said longitudinal axis of said axle extends between said ring and said disc.

17. The switching mechanism of claim 16, further comprising a phasing mechanism disposed between said ring and said disc to maintain a predetermined relationship between movement of said ring and movement of said disc.

18. The switching mechanism of claim 17, wherein said phasing mechanism includes:

an internal ring gear on said ring;

a disc gear on said disc; and a phasing gear in mesh with said ring gear and said disc gear.

19. A gear switching mechanism comprising:

a first axle defining a first longitudinal axis;

a first gear supported by said axle for rotation about a first longitudinal axis;

a first rotational coupling supported by said axle for rotation about said first longitudinal axis, and including a first driven gear for transmitting rotation outside said switching mechanism;

said first gear and said first rotational coupling supported for axial movement relative to each other along said longitudinal axis between a first position in which said first rotational coupling is in engagement with said first gear to transmit a rotary force thereto and a second position in which said first rotational coupling is disengaged from said first gear, said first rotational coupling having a first cam follower;

a shuttle defining at least one cam surface slidably engaged with said first cam follower and configured to move said first rotational coupling axially between said first and second positions as said cam surface and said first cam follower move relative to each other;

a second axle defining a second longitudinal axis;

a second gear supported by said second axle for rotation about said second longitudinal axis;

a second rotational coupling supported by said second axle for rotation about said second longitudinal axis and having a second cam follower slidably engaged with said at least one cam surface of said shuttle wherein said at least one cam surface is configured to move said second rotational coupling axially as said at least one cam surface and said second cam follower move relative to each other, said second rotational coupling including a second driven gear for transmitting rotation outside said switching mechanism separate from said first driven gear;

a drive mechanism for imparting relative movement between said shuttle and said first cam follower in a plane substantially perpendicular to said first longitudinal axis;

an input motor; and an input gear rotationally driven by said input motor, said input gear in simultaneous meshed engagement with said gear and said second gear.

20. The switching mechanism according to claim 19, further comprising:

a bias spring between each of said first gear and said first driven gear, and said second gear and said second driven gear; and an engagement spring disposed between each of said first cam follower and said first driven gear, and said second cam follower and said second driven gear, wherein each bias spring is configured to bias said corresponding rotational coupling to said second position, and each engagement spring is configured to overcome the corresponding bias spring when said corresponding cam follower moves relative to said corresponding cam surface.

* * * * *